(12) United States Patent
Thelemann et al.

(10) Patent No.: US 9,347,800 B2
(45) Date of Patent: May 24, 2016

(54) SENSOR AND SENSOR ELEMENT

(75) Inventors: Torsten Thelemann, Arnstadt (DE);
Tobias Schopf, Bad Birnbach (DE);
Thomas Wisspeintner, Ortenburg (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 206 days.

(21) Appl. No.: 13/566,119

(22) Filed: Aug. 3, 2012

(65) Prior Publication Data

US 2013/0033256 A1 Feb. 7, 2013

(30) Foreign Application Priority Data

Aug. 5, 2011 (DE) .......................... 10 2011 109 553

(51) Int. Cl.
*G01B 7/14* (2006.01)
*G01D 5/20* (2006.01)
*G01D 11/24* (2006.01)
*H01F 38/14* (2006.01)

(52) U.S. Cl.
CPC ................ *G01D 5/20* (2013.01); *G01D 11/245* (2013.01); *H01F 2038/143* (2013.01)

(58) Field of Classification Search
CPC ... G01D 11/245; G01D 5/20; H01F 2038/143
USPC ........................ 324/207.15–207.17
See application file for complete search history.

(56) References Cited

U.S. PATENT DOCUMENTS

| | | | |
|---|---|---|---|
| 7,498,802 B2* | 3/2009 | Takahata .................. | 324/207.15 |
| 8,833,160 B2 | 9/2014 | Hoenicka et al. | |
| 2001/0020846 A1* | 9/2001 | Miyata ..................... | 324/207.17 |
| 2008/0132153 A1* | 6/2008 | Rikita et al. ..................... | 451/56 |
| 2010/0203341 A1* | 8/2010 | Egan .............................. | 428/409 |
| 2010/0271163 A1* | 10/2010 | Nakamura .............. | B32B 18/00 336/200 |
| 2011/0100120 A1* | 5/2011 | Neuburger .......... | G01F 23/2845 73/304 R |
| 2011/0139618 A1* | 6/2011 | Serrels et al. ................. | 204/408 |
| 2012/0299585 A1* | 11/2012 | Hoenicka et al. ........ | 324/207.15 |

FOREIGN PATENT DOCUMENTS

| | | |
|---|---|---|
| DE | 10006422 A1 | 7/2000 |
| DE | 10314875 A1 | 11/2004 |
| DE | 10354694 C5 | 10/2008 |
| DE | 102008016829 | 10/2009 |
| DE | 102009060002 A1 | 6/2011 |
| GB | 2370123 A | 6/2002 |

OTHER PUBLICATIONS

The State Intellectual Property Office of the People's Republic of China, Notice of the First Office Action for Application No. 201210275818.5, Sep. 17, 2014, 17 pages, China.

* cited by examiner

*Primary Examiner* — Arleen M Vazquez
*Assistant Examiner* — Robert P Alejnikov, Jr.
(74) *Attorney, Agent, or Firm* — Alston & Bird LLP (57) ABSTRACT

Sensor with a one-layer or multi-layer sensor element operating in a contact-free manner and a housing 14 comprising an electric/electronic connection and, in given cases, electronic components, where the sensor element comprises a coil arrangement 1 whose windings 3 have a defined line width 5, line thickness 6, and line spacing 7 per layer 2 and whose layers 2 have a defined layer thickness 8b and, in given cases, a defined layer spacing 8a, characterized in that the sensor element is built up from ceramic layers in the sense of multi-layer ceramics and that with respect to traditional coil arrangements the layer thickness 8b or the layer spacing 8a is reduced and the number of windings per cross-sectional surface area is increased.

13 Claims, 4 Drawing Sheets

SENSOR AND SENSOR ELEMENT

CROSS REFERENCE TO RELATED APPLICATIONS

This application claims priority to German Application No. 10 2011 109 553.9, filed Aug. 5, 2011, and is hereby incorporated by reference in its entirety.

BACKGROUND

1. Technical Field

The invention concerns a sensor with a one-layer or multilayer sensor element operating in a contact-free manner and a housing comprising an electric/electronic connection and, in given cases, electronic components, where the sensor element comprises a coil arrangement whose windings have a defined line width, line thickness, and line spacing per layer and whose layers have a defined layer thickness and, in given cases, a defined layer spacing.

Furthermore, the invention concerns a corresponding sensor element, namely for use in a sensor according to the invention.

2. Description of Related Art

For measuring distance and monitoring position inductive sensors or eddy current sensors are frequently used. An essential component of the two types of sensor is a coil which is supplied with alternating current. In traditional sensors the coil regularly consists of numerous windings of insulated copper wire which are fixedly connected to one another with self-bonding wire or other sealing technologies and, depending of the type of sensor with or without a ferrite core, are integrated into the housing. In the housing or also offset therefrom electronics are provided which comprise an oscillator and the demodulator. In connection with this the coil is part of an oscillating circuit which is either a component of the oscillator or is supplied by it. Important in connection with this is high quality of the oscillating circuit in order specifically to ensure high measurement sensitivity of the sensor. High measurement sensitivity is the basic prerequisite for a wide range of measurement with simultaneously low susceptibility to interference.

For a rather long time sensors have been known in which the coil is implemented as a flat coil in printed circuit board technology. The printed circuit board technology has the advantage with respect to wound coils that the production costs are lower and the coil is part of an electronic printed circuit board. Recently the flat coil technology has been extended to ceramic substrates. Therein the coils are applied in the form of conductive printed circuit layers on a ceramic substrate. Several substrates are stacked one over another in layers, where the electrical connection between the layers is produced by through-connections. The layers are connected to one another by a sintering process at high temperatures and after the sintering form a compact unit.

An increase of the range of measurement of the sensor is possible due to the fact that the base distance between the sensor and the object to be measured is reduced. This can be achieved by the coil element being formed as part of the housing. The reduction of the base distance is achieved by the absence of the all-metal construction or the cap customary in conventional sensors. By means of a tight metal-ceramic connection between the coil element and housing there is in addition the advantage of a possible hermetic sealing of the interior of the sensor.

Along with the aforesaid advantages of the ceramic coils there are however also technical limitations. In particular for small coil diameters for small ranges of measurement conventionally wound coils exhibit, for example, significantly better quality, that is, higher inductances with lower resistances. For the quality of an oscillating circuit the following applies:

$$Q = \frac{\omega L}{R}$$

where
Q: coil quality
L: inductance
$\omega$: angular frequency
$\omega = 2\pi f$
f frequency of the coil current
R: coil resistance An increase of the inductance alone is however not expedient since with too high an inductance capacitive effects reduce the sensitivity of measurement or the time constant (and thus the temporal resolution) of the sensor will even become too high. Thus for a given measurement frequency an optimal inductance and an ohmic resistance must be chosen with which as high a quality as possible can be achieved.

For traditional wound coils the volume ratio of current-carrying copper litz wire to the insulating components lying therebetween (wire insulation and air or potting compound) is very large. In the optimization the wire cross section, the length, and the diameter of the coil as well as the number of windings can be affected. Thus it is possible over wide ranges to adapt the inductance as well as the ohmic resistance nearly independently. This leads to higher sensitivities in comparison to ceramic coils.

There the ratio between current-carrying layers and the insulating ceramic substrate is unfavorable. Furthermore, the ceramic substrate is only available in certain thicknesses. Also, the application of the current-carrying layers, e.g. by thick-layer printing processes, permits only certain ratios of printed conductor width to printed conductor thickness. Thus, for example, in thick-layer printing the width of the printed conductor must, depending on the paste system used, be clearly greater than the thickness.

An additional factor in coil design is the capacitive coupling of the windings among themselves. For coil systems in ceramic substrates the capacitive coupling is generally greater than for wound coils since despite greater distance of the printed conductors from one another also the effective surface between the printed conductors is greater and in addition the dielectric constant of the ceramics of $\in \approx 8$ increases the capacitance.

A known technology for achieving, in comparison to the screen printing process, as small a layer spacing as possible with a large line thickness is embossing. With an embossing die at the position of the individual windings the individual layers of the ceramic substrate are deformed.

After the embossing the conductive winding must be applied. This can, for example, be done by a photochemical process such as the FODEL® technology of DuPont or with a suitable printing process, e.g. by screen printing.

In order to be able to realize structure sizes which are as small as possible in a manner which is reliable in processing, a corresponding embossing tool must be manufactured very precisely. For different layer geometries an individual embossing tool is needed. These two prerequisites make the embossing very time-consuming and expensive. In embossing there is no removal of material. Rather, the individual layers are deformed. The therewith associated expulsion of material leads to different density distributions in the material which can create problems in further processing. Thus, for example, during sintering of the ceramic stresses in the material arise.

A photochemical process, such as, for example, FODEL, requires many process steps well coordinated with one another. As a rule a photochemical process comprises the process steps printing with photopaste, illumination, development, and washing.

The process steps needed in addition, in comparison to the standard process, as well as tools and consumable materials, are elaborate and expensive. Furthermore, at the edges of the photosensitive layer smearing can occur. This is particularly critical for small structural sizes since thereby short circuits between the windings can occur.

The printing of an embossed layer proves to be difficult above all for relatively small line spacings and widths since the positioning of the paste over the embossing must be done precisely. With imprecise positioning there arises at the edge of the winding smearing which after sintering can lead to short circuits.

Through the optimization of the coil design with the aid of embossing technology and with relatively high costs and great expenditure of time only limited improvements of the sensor characteristics can be achieved. Due to the greater number and as a rule also more elaborate process steps the reproducibility and the reliability of the process are reduced.

An additional possibility for production consists in removing material directly at the position of the windings. This can, for example, be done with a laser. Laser processing is however relatively time-consuming. This makes the process per se elaborate and expensive. In laser processing material is removed directly so that no compacting of material occurs. However, in so doing the faces of the cut are very rough. The great roughness creates problems during later filling with paste. Thus, for example, small air bubbles can arise which at the high sintering temperatures lead to stresses in the material due to the compressive expansion. Furthermore, the roughness enlarges the surface of the conductive layer. Since due to the measurement principle high frequencies are required, as a result of the skin effect the current flows through the coil substantially at the surface, whereby ultimately the resistance ultimately increases. The resistance also increases if due to the roughness at the boundary surface material mixtures between the conductive paste and the insulating ceramic occur. These effects have a negative effect on the electrical data of the sensor.

Sensors of the generic type, in particular of multi-layer ceramics, have been known for a rather long time. Merely by way of example let reference be made to DE 10 2008 016 829 A1 and DE 103 14 875 A1.

BRIEF SUMMARY

The object of the present invention is to develop and extend a sensor of the type mentioned in the introduction and a corresponding sensor element in such a manner that a sufficiently high sensitivity of measurement is realized for a large range of measurement. The sensor and the sensor element should distinguish themselves by as high a quality as possible along with as good an inductance as possible.

The object above is achieved by the features of the claims in reference to the sensor and to the sensor element. According thereto the sensor according to the invention and the sensor element according to the invention are characterized in that the sensor element is built up from ceramic layers in the sense of multi-layer ceramics and that with respect to traditional coil arrangements the layer thickness or more specifically the distance between the layers is reduced and the number of windings per cross-sectional surface area is increased, and, as a result, the quality is enhanced.

At this point let it be noted that for traditional coil arrangements the above discussions relating to the prior art apply. The dimensioning of the sensor elements provided there is substantially predetermined by the particular (known) method for producing sensor elements. Until now no thought has been given in reference to an optimization exploiting the framework conditions predetermined by the miniaturization, in particular not in reference to an optimized, reproducible sensor behavior resulting from the geometric design in comparison to a standard coil.

In this regard it has been recognized according to the invention that sensor elements of ceramic layers are quite particularly suitable for "geometric" optimization, namely in that the layer thickness or more specifically the distance between the layers is quite significantly reduced and the number of windings per cross-sectional surface area is increased. It is only with this measure than an increase in the number of windings per cross-sectional surface area is possible due to a significant reduction of the layer thickness or more specifically the layer spacing. An enhanced quality is the result.

In a manner according to the invention a ceramic one-layer or multi-layer coil arrangement is realized with a coil structure optimized especially for contact-free distance measurement, where through the optimization an increase of the coil quality, a reduction of the distance of the coil windings to the object to be measured and a reduction of capacitive couplings of the windings with one another is achieved.

In a manner according to the invention the quality of the sensors is improved during further miniaturization, i.e. in a surprising manner, in that the layer thickness or more specifically the layer spacing is reduced. The parameters line width, line spacing and line thickness can usually correspond to high values in the screen printing process, according to which, in particular, the line width may be in a range of 250 µm; the line spacing may be about 200 µm; and the line thickness may be about 25 µm. As a result, it is possible to achieve a quality (in relation to the range of measurement) of 0.5 mm$^{-1}$.

In a manner according to the invention it is possible to achieve a line width of, for example, 120 µm, a line spacing of 120 µm, and a line thickness of 25 µm, but at a very significantly reduced layer thickness in a range of about 50 p.m. At the same time it is possible to achieve a quality (in relation of the range of measurement) of 1.25 mm$^{-1}$ That is, the quality can be significantly improved in comparison to the conventional dimensions, a feature that can be attributed to the reduced distance between the layers or more specifically the reduced layer thickness.

Hence, with respect to the teaching according to the invention it is important that higher degrees of quality can be reduced due to a reduced layer thickness or more specifically a reduced layer spacing, while at the same time the other parameters with respect to conventional technologies can remain unchanged.

Due to the reduced layer spacing the number of windings per unit of cross-sectional surface area is increased. At the same time however the electrical resistance is increased with a greater number of windings. Nonetheless the quality is increased due to the higher resistance. The following derivation shows this clearly:

If the formula for the inductance and the resistance is substituted $$L \propto \frac{r^2 N^2}{l}$$

$$R = \frac{\rho}{A} 2r\pi N$$

where:
r: average coil radius
N: winding number
l: coil length
ρ: specific electrical resistance
A: cross-sectional surface area of the winding,
the product of the line width and the line thickness is assumed to be constant here
into the formula for the quality $$Q = \frac{\omega L}{R}$$

then the following term results for the quality:

$$Q = \text{const} \cdot \frac{rN}{l}$$

A constant cross-sectional surface area corresponds to a constant average coil radius r and a constant coil length l. An increase of the number of windings N with constant cross-sectional surface area due to the reduced layer spacing thus corresponds to a direct proportional increase of the quality Q.

From this connection an advantage follows especially for miniaturized coil arrangements, that is, arrangements with reduced coil radius r. The above-cited limitations with regard to minimum line width, thickness, and spacing have a negative effect in particular for reduced coil radii. If with reduced coil radius r the quality Q is supposed to remain constant, then the number of windings N must be increased. For an equal layer spacing this would lead to an increase of the coil length l, said increase being proportional to the number of windings N. This in turn would lead to a reduction of the quality Q proportional to the reduction of the coil radius r.

The inventive reduction of the layer thickness or layer spacing counteracts a reduction of the quality Q and thus enables a miniaturization of the coil element, while at the same time improving the quality.

Figure 2A:
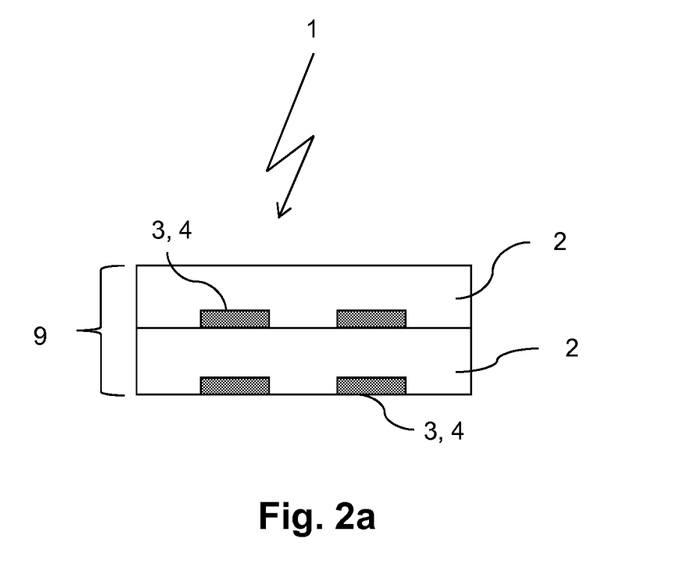
FIG. 2a shows in a schematic view the subject of FIG. 1 for a side-by-side comparison with a coil arrangement according to the invention as according to FIG. 2b.
Figure 2B:
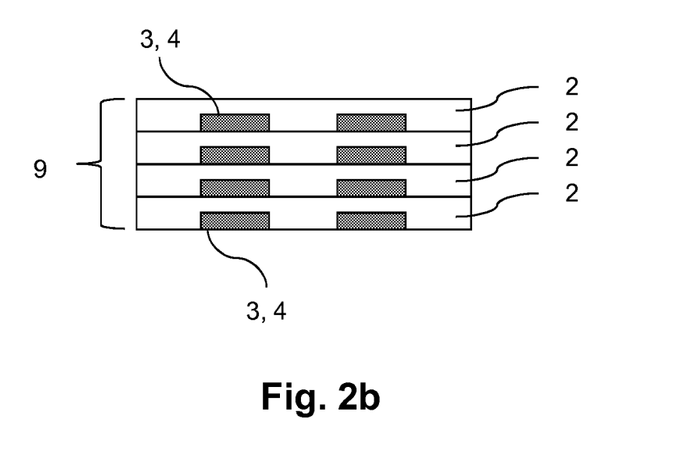
FIG. 2b shows in a schematic view an embodiment example of a coil arrangement according to the invention with four layers per unit of cross-sectional surface area.

In regard to this let reference be made to FIGS. 2a and 2b. FIG. 2a shows a traditional coil arrangement with two layers per unit of cross-sectional surface area. FIG. 2b shows a "compacted" coil arrangement with four layers per unit of cross-sectional surface area.

In practice it has been shown that miniaturized ceramic coil elements profit from the previously stated connection. Suitable layer thicknesses that may be taken into consideration may range between 25 μm and 50 μm. The line thickness may be 25 μm. A line spacing of 120 μm and a line width of 120 μm are suitable for achieving an improvement in the quality at a reduced layer spacing, in relation to the range of measurement at 1.25 mm$^{-1}$ This feature may be attributed predominantly to the reduced distance between the layers.

From a reduced layer thickness still further advantages follow which do not apply only to miniaturized coils. An optimized standard coil element is distinguished in that with constant coil radius r the layer spacing is reduced. Due to the reduced layer spacing the spacing of the coil to the object to be measured also becomes smaller, whereby the sensitivity of the measurement signal is increased. Through the reduction of the layer spacing the coil does not only come closer to the object to be measured but rather the coil length l also becomes smaller. Thus the average distance of the coil to the object to be measured is reduced, which also has an advantageous effect on the sensitivity of the signal.

The distance to the object to be measured can be reduced still further by the coil element being used as part of the sensor housing.

A further measure to improve the sensor element with reduced layer spacing follows from the offset arrangement of the coil windings.

This winding arrangement has advantages with regard to the mechanical stability. Through a homogeneous material distribution of the windings in the encircling carrier material there is a more uniform force and stress distribution in the case of a load, which leads to higher breaking load, e.g. with the introduction of axial force.

Furthermore, the offset winding arrangement leads to a reduced waviness of the surface of the coil element. This waviness arises related to the process and due to the additional application of winding material. The height of the additionally introduced material is added up over the multiple layers and emerges on the surface of the sensor element. Through the deviating offset of the position of the windings over the individual layers this waviness can be reduced in large part. Since as a rule smooth sensor surfaces are required this measure saves additional surface processing, such as, for example, grinding.

An additional advantage of the offset winding arrangement consists in the reduction of the capacitive coupling of the windings among themselves. Through the offset of the neighboring windings of two layers the effective spacing between these windings is increased. Likewise the effective surface between the windings is reduced, whereby on the whole the capacitance of the arrangement is reduced, which has a positive effect on the stability of the measurement signal.

DETAILED DESCRIPTION OF THE DRAWINGS

There are various possibilities of developing and extending the teaching of the present invention in an advantageous manner. With regard thereto reference is made on the one hand to the claims subordinate to claim 1 and on the other hand the following explanation of preferred embodiment examples of the invention with reference to the drawings. In connection with the explanation of the preferred embodiment examples of the invention, with the aid of the drawings preferred development and extension of the teaching are also explained in general. In the drawings:

DETAILED DESCRIPTION OF VARIOUS EMBODIMENTS

Figure 1:
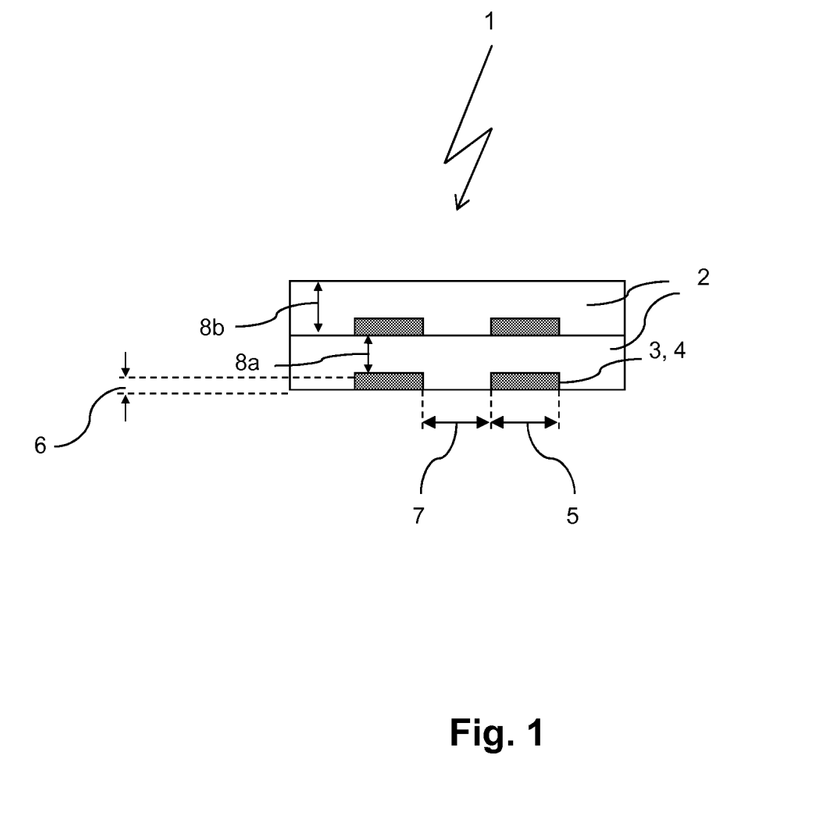
FIG. 1 shows in a schematic view the basic layout of a prior-art standard coil in cross section.

FIG. 1 shows in a schematic arrangement a standard coil 1 in cross section. In the embodiment example shown in FIG. 1 the coil comprises two layers 2 with windings 3 integrated there.

The winding 3 of the coil is defined by a line 4 which has a predefined line width 5 and a line thickness 6. The spacing between the lines 4 is denoted as the line spacing 7.

The spacing between the windings 3 of the layers 2 is denoted as the layer spacing 8a. Reference number 8b marks the thickness of an individual layer 2, and in the sequel will be denoted by 8b.

FIG. 2a shows once again the customary standard coil 1, from which the coil arrangement according to the invention and represented in FIG. 2b differs quite significantly, namely in that there in place of two layers 2 four layers 2 per unit of cross-sectional surface area 9 are provided. The four layers 2 provided according to FIG. 2b take up the same space as the two layers 2 in the customary standard coil 1 according to FIG. 2a.

Figure 3:
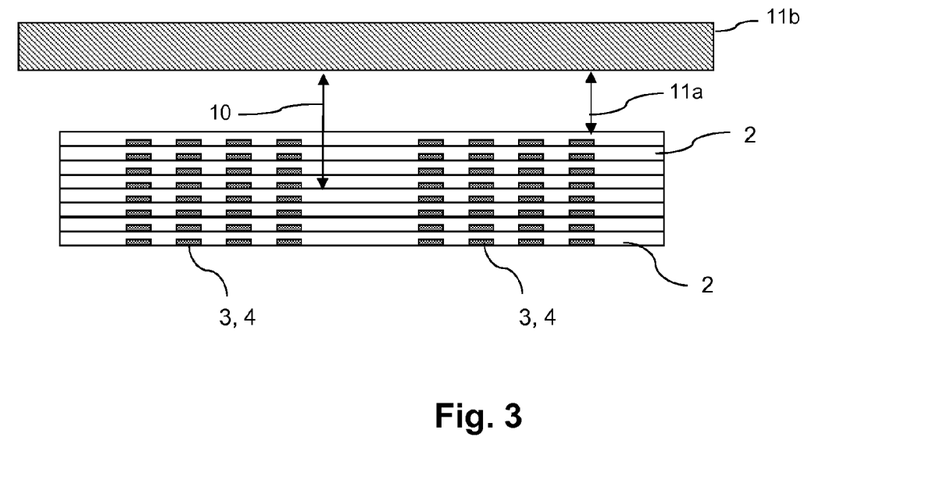
FIG. 3 shows in a schematic view in cross section an embodiment example of a coil according to the invention opposite an object to be measured, in particular for the definition of the average coil spacing and the distance to the object to be measured.

FIG. 3 shows in a schematic view an embodiment example of a coil arrangement according to the invention and comprising a total of eight layers 2, namely of a coil built up from ceramic layers 2 in cross section. There on one side the average coil spacing 10 and on the other side the distance 11 to the object to be measured 11b are drawn in.

Figure 4:
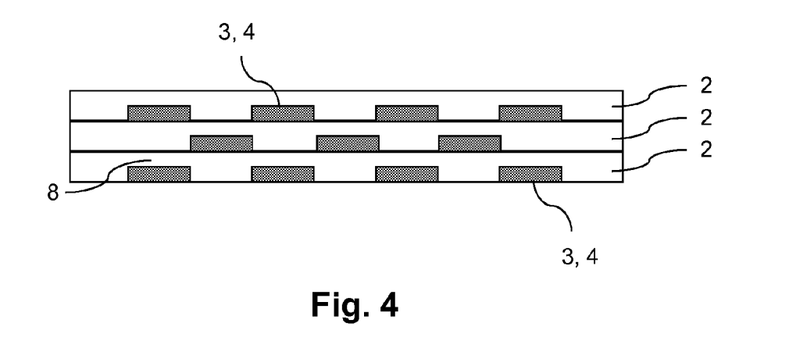
FIG. 4 shows in a schematic view in cross section an additional embodiment example of a coil arrangement according to the invention with offset coil windings and FIG. 5 shows in a schematic view in cross section an additional embodiment example of an eddy current sensor according to the invention with a coil arrangement according to the invention as a component of the coil housing.

FIG. 4 shows an additional embodiment example of a coil arrangement according to the invention which is built up from three layers 2. The windings 3 are offset relative to one another, whereby a reduced layer spacing 8 results.

Figure 5:
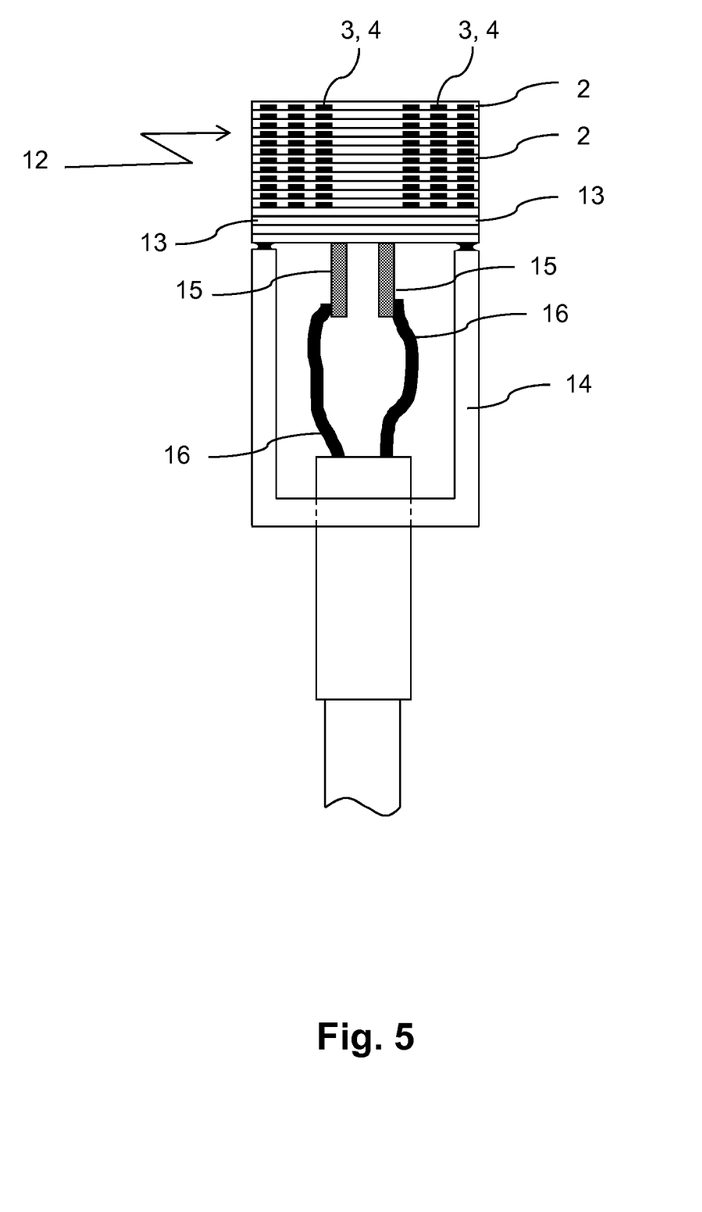

FIG. 5 shows in a schematic view an embodiment example of a sensor according to the invention in the example of an eddy current sensor. The sensor element comprises twelve layers 2 of a ceramic substrate with integrated windings 3. Furthermore, the coil arrangement 12 is supported by four layers 13 without windings, consisting of a ceramic substrate with a thickness of, for example, 50 μm. Thereby stabilization of the coil arrangement 12 is provided.

Moreover, FIG. 5 shows clearly that the coil arrangement 12 closes off the housing 14 on the measurement side. A hermetic sealing of the housing 14 is provided in that the coil arrangement 12 is connected to the housing 14 by active brazing.

Furthermore, in FIG. 5 it is indicated that the electrical contacts 15 of the coil arrangement 12 project into the housing 14. Therein there is realized contact to, provided as always, a connecting cable 16 which leads out of the housing 14 via customary sealing measures.

The sensor element can specifically consist of a multi-layer ceramic with 12 layers of ceramic substrate with a layer thickness of 50 μm. To increase stability these layers are sintered with four layers of conventional ceramic foil with a thickness of 100 μm. The width of the printed conductors, i.e. the line width, is 120 μm. The spacing of the windings relative to one another, i.e. the line spacing, is 120 μm. In total, 140 windings are provided. The line thickness may be 25 μm. In this case it is easy to achieve here a quality of 1.2 mm$^{-1}$ in relation to the range of measurement.

The sensor element is connected by active brazing fixedly to the metal housing of the sensor. In the housing 14 the connecting line is connected to the contacts on the rear side of the sensor element. Since the uppermost ceramic layer only has a thickness of 50 μm, the coil comes very close to the object to be measured, whereby the effective measurement range is increased with respect to the customary ceramic sensor elements. With the low line spacing the sensor has along with optimized quality a very low overall length, which is advantageous for miniaturization.

In a manner according to the invention the quality of the sensors is improved during further miniaturization, i.e. in a surprising manner, in that the layer thickness or more specifically the layer spacing is reduced. The parameters line width, line spacing and line thickness can usually correspond to high values in the screen printing process, according to which, in particular, the line width may be in a range of 250 μm; the line spacing may be about 200 μm; and the line thickness may be about 25 μm. As a result, it is possible to achieve a quality (in relation to the range of measurement) of 0.5 mm$^{-1}$.

In a manner according to the invention it is possible to achieve a line width of, for example, 120 μm, a line spacing of 120 μm, and a line thickness of 25 μm, but at a very significantly reduced layer thickness in a range of about 50 μm. At the same time it is possible to achieve a quality (in relation of the range of measurement) of 1.25 mm$^{-1}$. That is, the quality can be significantly improved in comparison to the conventional dimensions, a feature that can be attributed to the reduced distance between the layers or more specifically the reduced layer thickness.

Hence, with respect to the teaching according to the invention it is important that higher degrees of quality can be reduced due to a reduced layer thickness or more specifically a reduced layer spacing, while at the same time the other parameters with respect to conventional technologies can remain unchanged.

Due to the reduced layer spacing the number of windings per unit of cross-sectional surface area is increased. At the same time however the electrical resistance is increased with a greater number of windings. Nonetheless the quality is increased due to the higher resistance.

The following derivation shows this clearly:

If the formula for the inductance and the resistance is substituted $$L \propto \frac{r^2 N^2}{l}$$

$$R = \frac{\rho}{A} 2 r \pi N$$

where:
r: average coil radius
N: winding number
l: coil length
p: specific electrical resistance
A: cross-sectional surface area of the winding,
the product of the line width and the line thickness is assumed to be constant here
into the formula for the quality $$Q = \frac{\omega L}{R}$$

then the following term results for the quality:

$$Q = \text{const} \cdot \frac{rN}{l}$$

A constant cross-sectional surface area corresponds to a constant average coil radius r and a constant coil length 1. An increase of the number of windings N with constant cross-sectional surface area due to the reduced layer spacing thus corresponds to a direct proportional increase of the quality Q.

From this connection an advantage follows especially for miniaturized coil arrangements, that is, arrangements with reduced coil radius r. The above-cited limitations with regard to minimum line width, thickness, and spacing have a negative effect in particular for reduced coil radii. If with reduced coil radius r the quality Q is supposed to remain constant, then the number of windings N must be increased. For an equal layer spacing this would lead to an increase of the coil length 1, said increase being proportional to the number of windings N. This in turn would lead to a reduction of the quality Q proportional to the reduction of the coil radius r.

The inventive reduction of the layer thickness or layer spacing counteracts a reduction of the quality Q and thus enables a miniaturization of the coil element, while at the same time improving the quality.

In regard to this let reference be made to FIGS. 2a and 2b. FIG. 2a shows a traditional coil arrangement with two layers per unit of cross-sectional surface area. FIG. 2b shows a "compacted" coil arrangement with four layers per unit of cross-sectional surface area.

In practice it has been shown that miniaturized ceramic coil elements profit from the previously stated connection. Suitable layer thicknesses that may be taken into consideration may range between 25 µm and 50 µm. The line thickness may be 25 µm. A line spacing of 120 µm and a line width of 120 µm are suitable for achieving an improvement in the quality at a reduced layer spacing, in relation to the range of measurement at 1.25 mm$^{-1}$. This feature may be attributed predominantly to the reduced distance between the layers.

From a reduced layer thickness still further advantages follow which do not apply only to miniaturized coils. An optimized standard coil element is distinguished in that with constant coil radius r the layer spacing is reduced. Due to the reduced layer spacing the spacing of the coil to the object to be measured also becomes smaller, whereby the sensitivity of the measurement signal is increased. Through the reduction of the layer spacing the coil does not only come closer to the object to be measured but rather the coil length 1 also becomes smaller. Thus the average distance of the coil to the object to be measured is reduced, which also has an advantageous effect on the sensitivity of the signal.

The distance to the object to be measured can be reduced still further by the coil element being used as part of the sensor housing.

A further measure to improve the sensor element with reduced layer spacing follows from the offset arrangement of the coil windings.

This winding arrangement has advantages with regard to the mechanical stability. Through a homogeneous material distribution of the windings in the encircling carrier material there is a more uniform force and stress distribution in the case of a load, which leads to higher breaking load, e.g. with the introduction of axial force.

Furthermore, the offset winding arrangement leads to a reduced waviness of the surface of the coil element. This waviness arises related to the process and due to the additional application of winding material. The height of the additionally introduced material is added up over the multiple layers and emerges on the surface of the sensor element. Through the deviating offset of the position of the windings over the individual layers this waviness can be reduced in large part. Since as a rule smooth sensor surfaces are required this measure saves additional surface processing, such as, for example, grinding.

An additional advantage of the offset winding arrangement consists in the reduction of the capacitive coupling of the windings among themselves. Through the offset of the neighboring windings of two layers the effective spacing between these windings is increased. Likewise the effective surface between the windings is reduced, whereby on the whole the capacitance of the arrangement is reduced, which has a positive effect on the stability of the measurement signal.

With regard to further advantageous developments of the sensor according to the invention, in order to avoid repetitions, reference is made to the general part of the description as well as to the accompanying claims.

In conclusion let it be noted expressly that the above-described embodiment examples of the sensor according to the invention merely serve to explain the claimed teaching but said teaching is not restricted to the embodiment examples.

LIST OF REFERENCE NUMBERS

1 Standard coil
2 Layer
3 Winding
4 Line
5 Line width
6 Line thickness
7 Line spacing
8a Layer spacing
8b Layer thickness
9 Unit of cross-sectional surface area
10 Average coil distance
11a Distance to the object to be measured
11b Object to be measured
12 Coil arrangement
13 Layer without winding
14 Housing
15 Electrical contact
16 Connecting cable

The invention claimed is:

1. An eddy current sensor for measurement of a distance to an object, said sensor comprising:
a sensor element operating in a contact-free manner; and a housing comprising an electronic connection, wherein:
the sensor element comprises a coil arrangement whose windings have a line width, a line thickness, and a line spacing per layer and whose layers have a layer thickness and a layer spacing between neighboring windings;
the sensor element is built up from ceramic layers so as to define a multi-layer ceramics;
the coil arrangement of the sensor element has on one side a stabilized base without windings;
the layer thickness is less than 60 µm;
the line width is equal to the line spacing;
the coil arrangement of the sensor element has several windings within a single layer;

the windings of neighboring layers are disposed one above the other such that, due at least in part to the line spacing being substantially the same as the line width, edges of superimposed windings are substantially aligned with one another along a longitudinal axis of the sensor element; and the line thickness is substantially the same as the layer spacing such that the distance between the windings of neighboring layers is minimized and the number of windings per cross sectional surface area is maximized.

2. Sensor according to claim 1, wherein the housing further comprises electronic components.

3. Sensor according to claim 1, wherein the line thickness is equal to the layer spacing.

4. Sensor according to claim 1, wherein the stabilized base is built up from two to four layers of sintered ceramic foil.

5. Sensor according to claim 1, wherein the layer thickness is 50 pm.

6. Sensor according to claim 1, wherein the layer thickness is 25 pm.

7. Sensor according to claim 1, wherein the sensor element is part of the housing and closes and seals the housing on at least one side.

8. Sensor according to claim 1, wherein the sensor element is disposed substantially outside the housing.

9. Sensor according to claim 1, wherein the sensor element is disposed entirely outside the housing.

10. Sensor according to claim 1, wherein at least a portion of the sensor element forms a flush closure of the housing.

11. Sensor according to claim 1, wherein the sensor element is connected by active brazing fixedly to the housing.

12. Sensor element for an eddy current sensor for distance measurement, said sensor element comprising:

a coil arrangement whose windings have a line width, a line thickness, and a line spacing per layer and whose layers have a layer thickness and a layer spacing between neighboring windings; wherein:

the sensor element is built up from ceramic layers so as to define a multi-layer ceramics;

the coil arrangement of the sensor element has on one side a stabilized base without windings;

the layer thickness is less than 60 μm;

the line width is equal to the line spacing;

the coil arrangement of the sensor element has several windings within a single layer;

the windings of neighboring layers are disposed one above the other such that, due at least in part to the line spacing being substantially the same as the line width, edges of superimposed windings are substantially aligned with one another along a longitudinal axis of the sensor element; and the line thickness is substantially the same as the layer spacing such that the distance between the windings of neighboring layers is minimized and the number of windings per cross sectional surface area is maximized.

13. An eddy current sensor for distance measurement, said sensor comprising:

a sensor element operating in a contact-free manner; and a housing comprising an electronic connection, wherein:

the sensor element comprises a coil arrangement whose windings have a line width, a line thickness, and a line spacing per layer and whose layers have a layer thickness and a layer spacing between neighboring windings;

the sensor element is built up from ceramic layers so as to define a multi-layer ceramics;

the coil arrangement of the sensor element has on one side a stabilized base without windings, the stabilized base being built up from two to four layers of a sintered ceramic foil; and the layer thickness is less than 60 μm;

the line width is equal to the line spacing;

the coil arrangement of the sensor element has several windings within a single layer;

the windings of neighboring layers are disposed one above the other such that, due at least in part to the line spacing being substantially the same as the line width, edges of superimposed windings are substantially aligned with one another along a longitudinal axis of the sensor element; and the line thickness is substantially the same as the layer spacing such that the distance between the windings of neighboring layers is minimized and the number of windings per cross sectional surface area is maximized.

* * * * *